United States Patent
Cheng

(10) Patent No.: US 7,583,684 B2
(45) Date of Patent: Sep. 1, 2009

(54) AUTOMATIC COMMANDABLE SSID SWITCHING

(75) Inventor: Shelbun K. Cheng, Chino Hills, CA (US)

(73) Assignee: The Boeing Corporation, Chicago, IL (US)

(*) Notice: Subject to any disclaimer, the term of this patent is extended or adjusted under 35 U.S.C. 154(b) by 609 days.

(21) Appl. No.: 11/211,023

(22) Filed: Aug. 24, 2005

(65) Prior Publication Data
US 2007/0066306 A1    Mar. 22, 2007

(51) Int. Cl.
*H04L 12/56* (2006.01)
(52) U.S. Cl. .................. 370/401; 370/437; 370/412; 370/428
(58) Field of Classification Search .......... 370/437, 370/254
See application file for complete search history.

(56) References Cited

U.S. PATENT DOCUMENTS

| | | | | |
|---|---|---|---|---|
| 4,053,752 A | * | 10/1977 | DeJohn et al. ............... | 714/710 |
| 4,591,906 A | * | 5/1986 | Morales-Garza et al. ...... | 725/24 |
| 6,947,726 B2 | | 9/2005 | Rockwell | |
| 7,149,521 B2 | * | 12/2006 | Sundar et al. ............ | 455/435.1 |
| 7,200,362 B2 | * | 4/2007 | Muratsu ..................... | 455/41.2 |
| 2003/0158922 A1 | * | 8/2003 | Park ........................... | 709/222 |
| 2004/0158863 A1 | | 8/2004 | McLain | |
| 2005/0281223 A1 | | 12/2005 | D'Annunzio | |
| 2006/0002404 A1 | * | 1/2006 | Igarashi ..................... | 370/401 |
| 2006/0080390 A1 | | 4/2006 | Ung et al. | |
| 2006/0165103 A1 | * | 7/2006 | Trudeau et al. ............. | 370/401 |
| 2007/0067452 A1 | | 3/2007 | Fung et al. | |
| 2007/0206506 A1 | | 9/2007 | Purpura | |
| 2007/0206511 A1 | | 9/2007 | Purpura | |
| 2007/0274537 A1 | | 11/2007 | Srinivasan | |
| 2007/0297447 A1 | | 12/2007 | Purpura | |
| 2008/0101252 A1 | | 5/2008 | Bui | |

* cited by examiner

*Primary Examiner*—Dang T Ton
*Assistant Examiner*—Li Zhou
(74) *Attorney, Agent, or Firm*—Harness, Dickey & Pierce, P.L.C.

(57) ABSTRACT

A system and method on for automatically switching from a first local area network (LAN) to a second LAN is provided. A transmission data application is requested and transmitted on the first LAN in accordance with a first service set identity (SSID). A second SSID is retrieved that is associated with a requested transmission data application for operation on the second LAN. The first SSID is automatically switched with the second SSID to automatically disassociate the networking device from the first LAN and associate the networking device with the second LAN, and to begin processing the transmission data application on the second LAN.

16 Claims, 2 Drawing Sheets

AUTOMATIC COMMANDABLE SSID SWITCHING

FIELD OF THE INVENTION

The present invention relates to a wireless local area network (WLAN). More specifically, the present invention relates to automatically switching a service set identity (SSID) of a networking device to connect to a WLAN based on a user selected transmission data application.

BACKGROUND OF THE INVENTION

Wireless networking is well known in the art. Today, many wireless network systems are designed such that all transmission data applications concurrently utilize the same wireless local area network (WLAN). In doing so, wireless network systems are confronted with similar problems related to network security, quality of service (QoS), overhead of separating data for each transmission data application, monitoring and controlling usage for each transmission data application, and allocating resources for each transmission data application.

Therefore, it would be highly desirable to provide a wireless networking strategy that enables each type of transmission data to be dynamically and automatically disassociated from one WLAN and dynamically associated with a different WLAN when needed.

SUMMARY OF THE INVENTION

In accordance with the present invention, a method for automatically and dynamically switching from a first local area network (LAN) to a second LAN. In one implementation, the method includes using a networking device to request a transmission data application operating on said first LAN in accordance with a first service set identity (SSID). A second SSID that is associated with a requested transmission data application for operation on a second LAN is retrieved. Additionally, the method may include automatically and dynamically switching the first SSID with the second SSID to automatically disassociate the networking device with the first LAN and associate the networking device with the second LAN, and to begin processing the requested transmission data application on the second LAN.

In another aspect of the present invention, a wireless communication system for automatic commandable SSID switching is provided. One aspect of the system comprises a first data store for storing a plurality of service set identities and related information. Each service set identity comprises a network name of a particular wireless local area network needed to access and communicate on a local area network, such as a wireless local area network.

A second data store is used for storing a plurality of transmission data applications used to transmit at least one specific type of transmission data on a local area network. Each transmission data application corresponds to at least one service set identity.

A server is used to identify a requested transmission data application on a first wireless local area network using a first service set identity, and to retrieve a second service set identity that corresponds to the requested transmission data application. The server transmits the second service set identity to a networking device.

The networking device, in wireless communication with the server, sends the request for the transmission data application selected by a user. Additionally, the networking device retrieves the second service set identity from the server. The networking device automatically and dynamically switches and replaces the first service set identity with the second service set identity to begin processing transmission data on a second wireless local area network.

Further areas of applicability of the present invention will become apparent from the detailed description provided hereinafter. It should be understood that the detailed description and specific examples, while indicating various preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
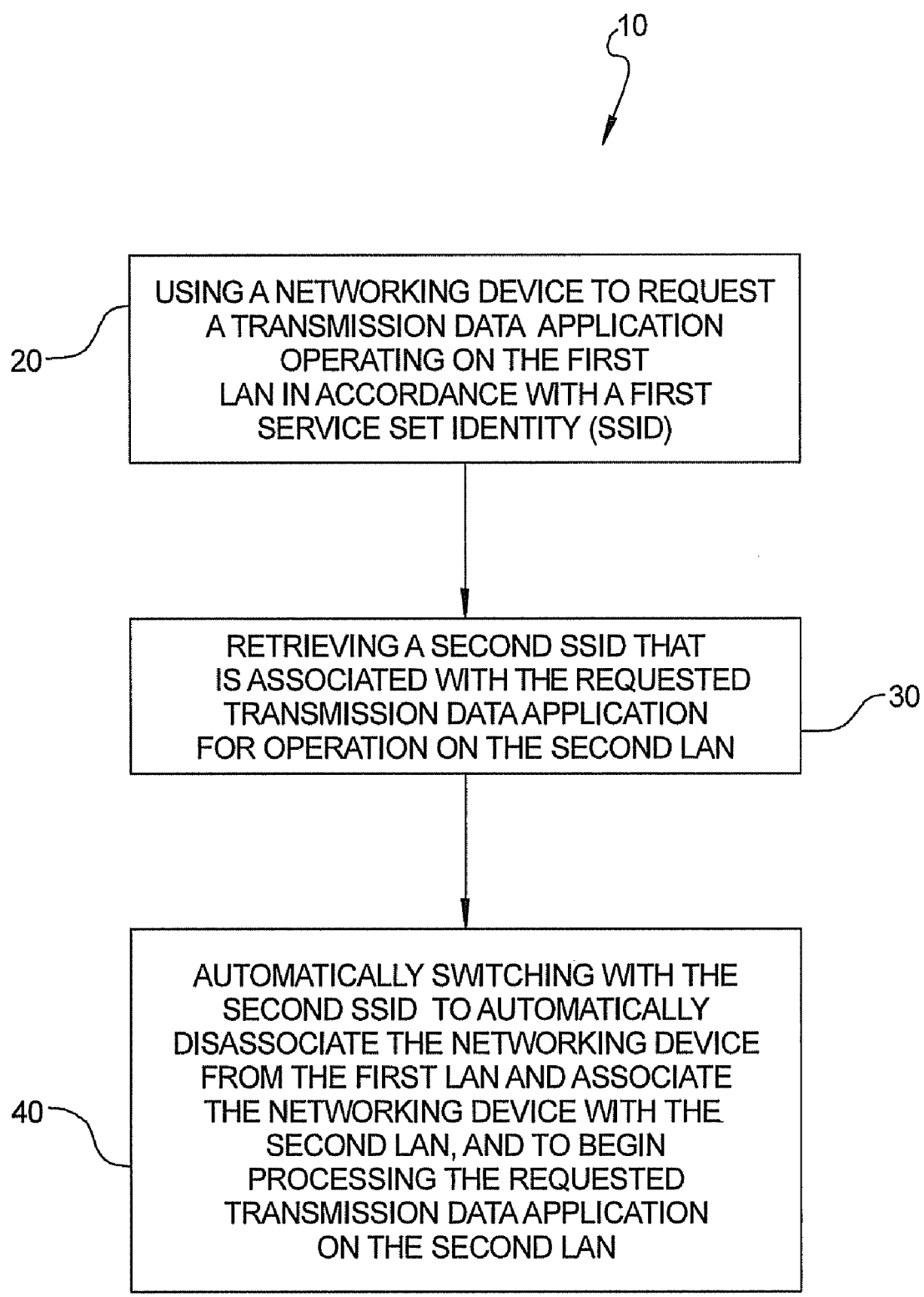
FIG. 1 is a flow chart of a preferred implementation of the present invention depicting a method for automatic commandable service set identity (SSID) switching in a wireless local area network (WLAN) system; and, FIG. 2 is a block diagram of a system implementing the method in FIG. 1.

FIG. 1 illustrates a preferred method 10 in accordance with the present invention for automatically switching from a first local area network (LAN) to a second LAN. The method 10 includes using a networking device to request a transmission data application operating on the first LAN in accordance with a first service set identity (SSID) at operation 20. The method 10 further includes retrieving a second SSID that is associated with the requested transmission data application for operation on a second LAN at operation 30. The first SSID is then automatically and dynamically switched with the second SSID to automatically disassociate the networking device with the first LAN and associate the networking device with the second LAN, and to begin processing the requested transmission data application on the second LAN at operation 40. Furthermore, switching from the first LAN to the second LAN is seamlessly completed to a user requesting the transmission data application.

Figure 2:
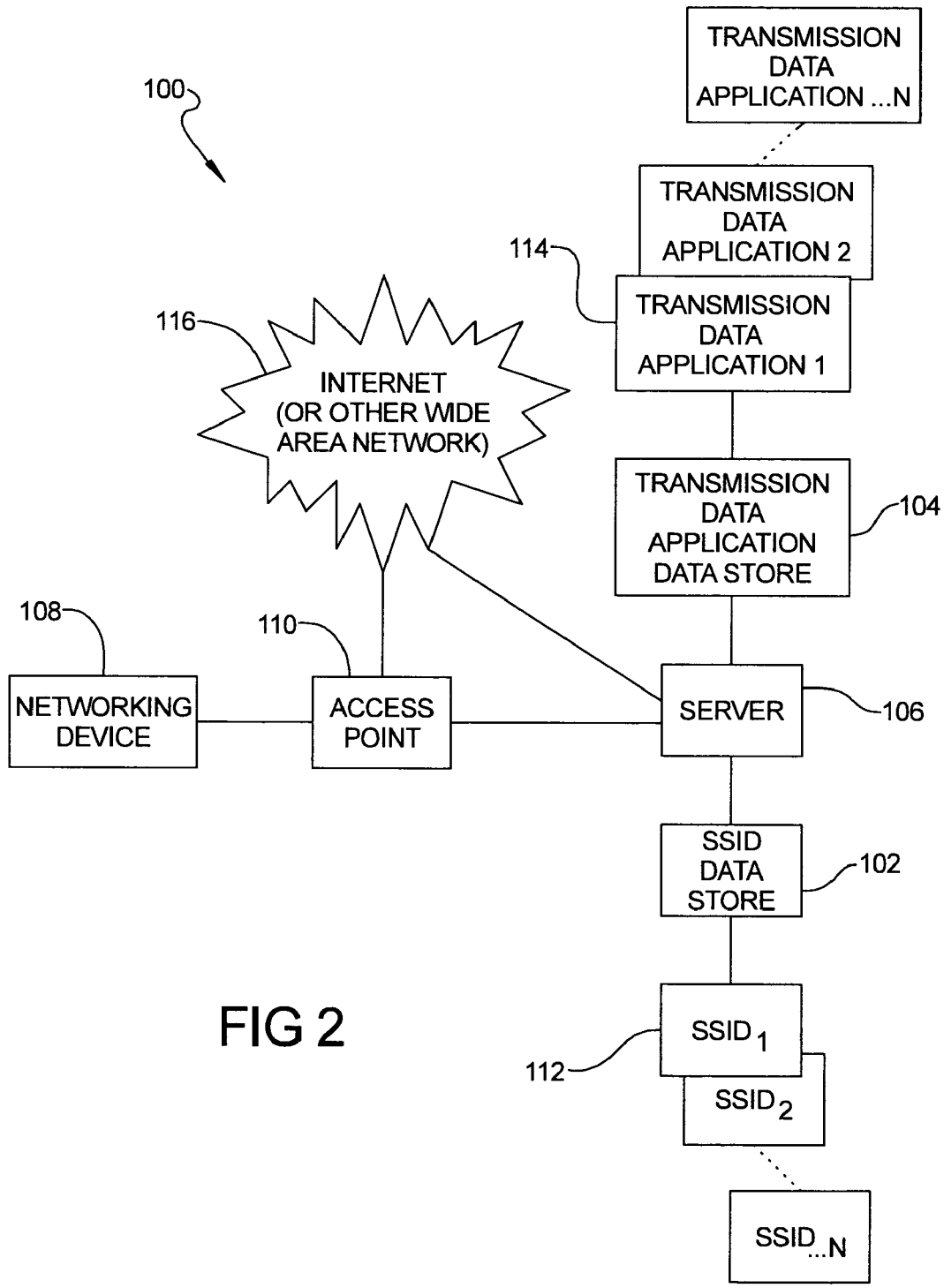

FIG. 2 depicts a preferred embodiment of a wireless communication system 100 implementing the method 10 described in connection with FIG. 1. The system may utilize protocols and requirements of the IEEE 802.11 standard for wireless networks. The system comprises a first or SSID data store 102, a second or transmission data application data store 104, a server 106, a networking device 108, and an access point device 110.

The SSID data store 102 and the transmission data application data store 104 are in data communication with the server 106. The server 106 is also in data communication with the access point device 110. The access point device 110 is, in turn, in data communication with the networking device 108.

The SSID data store 102 stores a plurality of SSIDs 112 and related information. Each SSID is indicative of a local area network (LAN) name, such as a wireless local area network (WLAN) name, needed to access and communicate on a specific WLAN. Additionally, each SSID includes an SSID identifier and an SSID name. The related information comprises a channel number and, if necessary, a secure enhancement feature. The channel number includes a frequency band in which a specific broadcast signal is transmitted over for the WLAN. The security enhancement feature may comprise an encryption key such as, for example, a wired equivalent privacy (WEP) key or a WiFi Protected Access (WPA) key. Additionally, the security enhancement feature is indicative of an encryption protocol that encrypts data on the WLAN that can only be read by authorized users with the correct decryption key.

The transmission data application data store 104 stores a plurality of transmission data applications 114. Each transmission data application transmits at least one type of transmission data on a local area network (LAN). The transmission data includes, but is not limited to, video data, voice data, and alphanumeric data. Alphanumeric data includes, but is not limited to, data having letters, numbers, punctuation marks, and mathematical and other conventional symbols. Each transmission data application corresponds to at least one SSID stored within the SSID data store 102. Additionally, each transmission data application stored in the transmission data application data store 104 includes a transmission data identifier and a corresponding SSID identifier.

The server 106 is operable to receive a request for a transmission data application from the networking device 108 on a first WLAN using a first SSID. The first SSID is indicative of an SSID used to access the WLAN to transmit the request for the transmission data application to the server 106 and other devices. The networking device 108 will be further discussed later. While accessing the transmission data application data store 104, the server 106 is operable to determine if a requested transmission data application exists within the transmission data application data store 104 and identify the requested transmission data application. If the transmission data application does not exist within the transmission data application data store 104, the server 106 is operable to update the transmission data application data store 104 with any necessary information related to the transmission data application, such as the transmission data application identifier, the channel number, and the encryption key, if necessary. Additionally, the server 106 may be coupled to and interact with an internet system or other wide area network 116.

If the transmission data application exists within the transmission data application data store 104, the server 106 identifies the transmission data application via the transmission data-application identifier. Using the transmission data application identifier, the server 106 determines the SSID identifier to retrieve a second SSID and related information. Additionally, the server 106 to compares the first SSID to the second SSID. If the first SSID is equal to the second SSID, the server 106 signals the access point device 110 to begin transmitting the transmission data on the first WLAN. The access point device 110 will be further discussed momentarily. On the other hand, if the server 106 determines that the second SSID is not equal to the first SSID, the server 106 transmits the second SSID and the related information to the networking device 108.

Although not limited to, the networking device 108 may comprise, for exemplary purposes only, a computer. Additionally, the networking device 108 includes a station (not shown). The station comprises a component that connects to a device having wireless communication capabilities. For example, a station may include, but is not limited to, a network adapter or a network interface card. Utilizing the station, the networking device 108, in wireless communication form, transmits the request for the transmission data application selected by a user to the server 106, via the access point device 110. The networking device 108 retrieves the second SSID and the related information sent by the server 106.

Upon receipt of the second SSID and the related information, the networking device 108 disassociates from the first WLAN. A disassociation is indicative of the networking device 108 informing the access point device 110 that the networking device 108 no longer requires the services of a particular WLAN. The networking device 108 automatically and dynamically switches or replaces the first SSID and corresponding related information in order to communicate on the second WLAN using the second SSID and the related information.

Additionally, the networking device 108 is operative to request an association to the second WLAN using the second SSID and the related information. The association is indicative of a logical connection between the networking device 108 and the access point device 110 in order for the access point to determine where and how to deliver data to the networking device 108. After associating to the second WLAN, the networking device 108 processes the transmission data using the requested transmission data application via the second WLAN.

The access point device 110, in data communication with the networking device 108, the server 106, and the internet system or other wide area network 116, directs transmission data to the networking device 108, the server 106, and the internet system 116, if necessary. Additionally, the access point device 110 associates and disassociates a wireless medium, such as the networking device 108, from and to a specific WLAN. More specifically, the access point device 110 acknowledges the disassociation of the networking device 108 from the first WLAN. Additionally, the access point device 110 receives the request to associate the networking device 108 to the second WLAN. Upon receipt of the request, the access point device 110 associates the networking device 108 to the second WLAN based on the second SSID and the related information.

Additionally, the access point device 110 allocates resources to support the server 106, the networking device 108, and other wireless transmission data users. More specifically, the access point device 110 is configured to provide a high priority quality of service (QoS) for each WLAN that is designated for a transmission data application related to streaming video or transmitting voice data. The access point device 110 is further configured to provide a higher level of high priority QoS for a WLAN and a corresponding SSID designated for transmitting voice data than for a WLAN and a corresponding SSID designated for streaming video. The access point device 110 is also configured to implement the security enhancement feature for a SSID and a WLAN relating to alphanumeric data, such as transactional data.

In an alternative embodiment, the access point device 110 employs all the functions and features of the server 106. For example, the transmission data application data store 104 and the SSID data store 102 are coupled to the access point device 110. Additionally, the access point device 110 receives the request for a transmission data application and identifies the transmission data application. The access point retrieves the SSID and related information that corresponds with an identified transmission data application. The access point device 110 transmits the first SSID and the related information for the requested transmission data application to the networking device 108. Additionally, either the networking device 108 or the access point device 110 may disassociate the networking device 108 from the second WLAN based on the second SSID and the related information.

In operation, the user initiates an operation of the networking device 108, in wireless communication, to authenticate and associate with the access point device 110 using the first SSID and first related information on the first WLAN. Using a web browser, the user loads a website, for example, www.boeing.com. Next, the user selects and clicks on a uniform resource locator (URL) link for a transmission data application, such as streaming video data. The networking device 108 then sends a request for streaming video data to the server 106.

Upon receiving the request, the server 106 accesses the transmission data application data store 104 to determine if the transmission data application relating to the streaming video data exists. If the transmission data application does not exist, the server 106 will update the transmission data application data store 104 with an identifier taken from the request. Additionally, the server 106 will assign and store a corresponding SSID identifier for at least one WLAN with the transmission data application identifier. The SSID identifier will correspond to a previously stored SSID in the SSID data store 102.

On the other hand, if the transmission data application exists in the transmission data application data store 104 the server 106 identifies the transmission data application identifier in the transmission data application data store 104 and retrieves the second SSID and a second set of related information, if available. The server 106 compares the second SSID to the first SSID. If the second SSID is equal to the first SSID, the server 106 signals the access point device 110 to continue transmitting data on the first WLAN. If the second SSID is not equal to the first SSID, the server 106 sends the second SSID and the second related information to the networking device 108.

The networking device 108 receives the second SSID and the second related information. Additionally, the networking device 108 automatically and dynamically switches and replaces the first SSID and the first related information for the second SSID and the second related information. The networking device 108 also sends a disassociating message to the access point device 110 to disassociate from the first WLAN. The access point device 110, in turn, acknowledges the dissociation of the networking device 108 from the first WLAN. Next, the networking device 108 sends a request to associate to a second WLAN based on the second SSID and the second related information to the access point device 110. The access point device then associates the networking device 108 to the second WLAN based on the second SSID and the second related information. The networking device 108 begins to process transmission data using the second WLAN.

Using the second SSID and the second related information, the access point device 110 determines a level of priority based on the second SSID. For example, the access point device 110, for an SSID for video streaming, will provide a high priority quality of service. Additionally, the access point will provide the transmission data application for video data at a lower priority of high priority QoS than a transmission data application for transmitting voice data.

The method 10 and system 100 of the present invention thus enables automatically and dynamically switching of SSIDs to access a particular WLAN based on a requested transmission data application that is seamlessly completed to the user, once the user requests the transmission data application. Additionally, the operation of automatically and dynamically switching from the first WLAN to the second WLAN based on the requested transmission data application will occur in a predetermined amount of time, for example, less than or about 10 seconds.

By designating each transmission data application its own WLAN several problems are solved that relate to network security, Quality of Service (QoS), overhead of separating data for each application, monitoring and controlling usage and resource allocation for each transmission data application. Additionally, each SSID is preconfigured to optimally support selected transmission data applications.

While various preferred embodiments have been described, those skilled in the art will recognize modifications or variations which might be made without departing from the inventive concept. For example, the system 100 may utilize several access point devices, although not all of the benefits of the various preferred embodiments and implementations may be utilized. Each access point device may control or be configured for a particular SSID for a particular WLAN. Thus, the networking device 108 may associate to a new access point device for a second WLAN based on the second SSID. The above examples illustrate the invention and are not intended to limit it. Therefore, the description and claims should be interpreted liberally with only such limitation as is necessary in view of the pertinent prior art.

What is claimed is:

1. A method for automatically and seamlessly switching from a first local area network (LAN) to a second LAN, the method comprising:
    using a networking device to request a transmission data application operating on the first LAN in accordance with a first service set identity (SSID);
    retrieving a second SSID that is associated with the requested transmission data application for operation on the second LAN;
    comparing the first SSID to the second SSID;
    automatically, dynamically switching the first SSID with the second SSID based on the requested transmission data application to automatically disassociate the networking device from the first LAN and associate the networking device with the second LAN, and to begin processing the requested transmission data application on the second LAN; and
    transmitting transmission data on the first LAN using the first SSID when the first SSID is equal to the second SSID.

2. The method of claim 1, wherein at least one of the LANs further comprises a wireless local area network (WLAN).

3. The method of claim 1, further comprising:
    determining whether the requested transmission data application is stored within a data store for storing transmission data applications; and,
    updating the data store when the requested transmission data application does not exist within the data store.

4. The method of claim 1, further comprising:
    providing a high priority quality of service (QoS) for each SSID designated for a transmission data application related to streaming video and transmitting voice data.

5. The method of claim 1, further comprising:
    providing a higher level of high priority QoS for each SSID designated for a transmission data application related to transmitting voice data than for a transmission data application related to streaming video.

6. The method of claim 1, further comprising:
    implementing a security enhancement feature for each SSID designated for a transmission data application related to transmitting transactional data.

7. A wireless communication system for automatically and seamlessly switching from a first local area network (LAN) to a second LAN, the system comprising:
- a first data store for storing a plurality of service set identities and related information, wherein each service set identity comprises a network name of a LAN needed to access and communicate on a particular LAN;
- a second data store for storing a plurality of transmission data applications used to transmit at least one specific type of transmission data on a LAN, wherein each transmission data application corresponds to at least one service set identity;
- a server operable to identify a requested transmission data application transmit on the first LAN using a first service set identity and retrieving a second service set identity that corresponds to the requested transmission data application, wherein the server transmits the second service set identity; and
- a networking device in wireless communication with the server and operable to send a request for a transmission data application selected by a user, wherein the networking device is adaptive to:
- retrieve the second service set identity;
- compare the first service set identity to the second service set identity;
- the networking device is adapted to automatically and dynamically switch the first service set identity with the second service set identity to begin processing transmission data on the second LAN; and
- wherein the server is further operative to determine when the requested transmission data application is not stored within the second data store and update the second data store with information related to the requested transmission data application.

8. The system of claim 7, wherein the networking device is further operative to automatically and dynamically disassociate from the first LAN based on the requested transmission data application and send a request for an association to the second LAN based on the second service set identity.

9. The system of claim 7, further comprising an access point device in wireless communication with the networking device and operable to disassociate the networking device from the first LAN based on the second service set identity, and wherein the access point device is operative to associate the networking device to the second LAN.

10. The system of claim 7, wherein the related information comprises a channel number.

11. The system of claim 7, wherein the related information comprises an encryption key.

12. A wireless communication system for automatically switching from a first local area network (LAN) to a second LAN, the system comprising:
- a data store for storing a plurality of service set identities and related information, wherein each service set identity comprises a network name of a LAN needed to access and communicate on a particular LAN;
- a data store for storing a plurality of transmission data applications used to transmit at least one type of transmission data on a LAN, wherein each transmission data application corresponds to at least one service set identity;
- an access point device operable to receive a request for a transmission data application transmitted on the first LAN using a first service set identity, wherein the access point device retrieves a second service set identity that corresponds with a requested transmission data application, and wherein the access point device transmits the second service set identity;
- a networking device in wireless communication with the access point is operable to send the request for the transmission data application selected by a user and retrieve the second service set identity in order to communicate on the second LAN, and wherein the networking device is operative to:
- compare the first service set identity with the second service set identity; and
- automatically and dynamically switch and replace the first service set identity with the second service set identity to communicate on the second LAN order to process transmission data using the requested transmission data application;
- wherein the access point device disassociates the networking device from the first LAN based on the second service identity and associates the networking device to the second LAN; and
- wherein the access point device is further operative to begin transmitting the requested transmission data application on the first LAN using the first service set identity when the first service set identity is equal to the second service set identity.

13. The system of claim 12, wherein the access point device is further operative to compare the first service set identity to the second service set identity.

14. The system of claim 12, wherein the access point device is configured to provide a high priority quality of service for each service set identity designated for a transmission data application related to streaming video and transmitting voice data.

15. The system of claim 12, wherein the access point device is configured to provide a higher level of priority quality of service for each service set identity for a transmission data application relating to transmitting voice data than for each service set identity for a transmission data application relating to streaming video.

16. The system of claim 12, wherein the access point device is configured to implement a security enhancement feature for each service set identity for transmission data applications relating to transmitting transactional data.

* * * * *

UNITED STATES PATENT AND TRADEMARK OFFICE
CERTIFICATE OF CORRECTION

PATENT NO.       : 7,583,684 B2                                          Page 1 of 1
APPLICATION NO.  : 11/211023
DATED            : September 1, 2009
INVENTOR(S)      : Shelbun K. Cheng It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 982 days.

Signed and Sealed this

Fourteenth Day of September, 2010

David J. Kappos
*Director of the United States Patent and Trademark Office*